(12) United States Patent
Yamamoto et al.

(10) Patent No.: US 10,999,114 B2
(45) Date of Patent: May 4, 2021

(54) TRANSMISSION APPARATUS, RECEPTION APPARATUS, AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Lilei Wang, Beijing (CN); Takashi Iwai, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/324,303

(22) PCT Filed: Aug. 11, 2016

(86) PCT No.: PCT/CN2016/094623
§ 371 (c)(1),
(2) Date: Feb. 8, 2019

(87) PCT Pub. No.: WO2018/027796
PCT Pub. Date: Feb. 15, 2018

(65) Prior Publication Data
US 2019/0173712 A1 Jun. 6, 2019

(51) Int. Cl.
*H04L 27/26* (2006.01)
*H04L 27/00* (2006.01)
(Continued)

(52) U.S. Cl.
CPC ........ *H04L 27/2634* (2013.01); *H04L 5/0094* (2013.01); *H04L 27/0008* (2013.01);
(Continued)

(58) Field of Classification Search
CPC .............. H04L 27/2634; H04L 5/0094; H04L 27/0008; H04L 27/2614; H04L 5/0007; H04W 76/27; H04W 72/0453
See application file for complete search history.

(56) References Cited

U.S. PATENT DOCUMENTS

2012/0230449 A1    9/2012   Futatsugi et al.

FOREIGN PATENT DOCUMENTS

JP    WO2011/055833 A1    3/2013

OTHER PUBLICATIONS

"WF on waveform candidates categorization", 3GPP TSG RAN WG1 Meeting #85, R1-165666, May 23-27, 2016, Orange, Spreadtrum, InterDigital, ZTE, Cohere, Telstra.*

(Continued)

*Primary Examiner* — Chi H Pham
*Assistant Examiner* — Ji-Hae Yea
(74) *Attorney, Agent, or Firm* — Seed IP Law Group LLP

(57) ABSTRACT

A terminal (transmission apparatus) is disclosed, which is capable of appropriately configuring processing of a Post-IFFT section in accordance with a communication environment in signal waveform generation. In the terminal, an IFFT section performs IFFT processing on a transmission signal; a control section determines a signal waveform configuration for the transmission signal after the IFFT processing in accordance with a communication environment of the terminal; and the Post-IFFT section performs Post-IFFT processing on the transmission signal after the IFFT processing based on the determined signal waveform configuration.

4 Claims, 7 Drawing Sheets

(51) Int. Cl.
  *H04W 76/27* (2018.01)
  *H04L 5/00* (2006.01)
  *H04W 72/04* (2009.01)

(52) U.S. Cl.
  CPC ..... *H04L 27/2614* (2013.01); *H04W 72/0453* (2013.01); *H04W 76/27* (2018.02); *H04L 5/0007* (2013.01)

(56) References Cited

OTHER PUBLICATIONS

"OFDM for 5G: Cyclic Prefix versus Zero Postfix, and Filtering versus Windowing", 2016 IEEE International Conference on Communications (ICC), May 1, 2016.*
"Waveform Candidates", 3GPP TSG-RAN WG1 Meeting #84b, R1-162199, Apr. 11-15, 2016, Qualcomm Incorporated.*
"5G Waveform & Multiple Access Techniques", Nov. 4, 2015, Qualcomm.*
National Taiwan University ("OFDM-Based Waveform With Precoding Techniques", 3GPP TSG RAN WG1 Meeting #85, R1-165113, May 23-27, 2016) (Year: 2016).*
3GPP TS 36.211 V13.1.0, "3rd Generation Partnership Project; Technical Specification Group Radio Access Network; Evolved Universal Terrestrial Radio Access (E-UTRA); Physical channels and modulation (Release 13)," Mar. 2016, 155 pages.
3GPP TS 36.212 V13.1.0, "3rd Generation Partnership Project; Technical Specification Group Radio Access Network; Evolved Universal Terrestrial Radio Access (E-UTRA); Multiplexing and channel coding (Release 13)," Mar. 2016, 129 pages.
3GPP TS 36.213 V13.0.0, "3rd Generation Partnership Project; Technical Specification Group Radio Access Network; Evolved Universal Terrestrial Radio Access (E-UTRA); Physical layer procedures (Release 13)," Dec. 2015, 326 pages.
Ericsson, "On OFDM in NR," R1-164629, Agenda Item 7.1.3.1, *3GPP TSG-RAN WG1 #85*, Nanjing, China, May 23-27, 2016, 7 pages.
International Search Report, dated May 12, 2017, for International Application No. PCT/CN2016/094623, 3 pages.
NTT DOCOMO, Inc., "Comparison of candidate waveforms," Agenda Item 7.1.3.1, R1-165173, *3GPP TSG RAN WG 1 Meeting #85*, Nanjing, China, May 23-27, 2016, 34 pages.
Orange, "Flexibly Configured OFDM (FC-OFDM) waveform," Agenda Item 7.1.3.1, R1-164619, *3GPP TSG RAN WG1 Meeting #85*, Nanjing, China, May 23-27, 2016, 14 pages.
Panasonic, "Technical proposals and considerations for LTE advanced," R1-081791, *3GPP TSG RAN WG1 Meeting #53*, Kansas City, Missouri, U.S.A, May 5-9, 2008, 16 pages.
Vakilian et al., "Universal-Filtered Multi-Carrier Technique for Wireless Systems Beyond LTE," *IEEE Globecom Workshops*, Atlanta, Georgia, Dec. 9-13, 2013, pp. 223-228 (6 pages).
ZTE Corp, ZTE Microelectronics, "Discussion on FB-OFDM of new waveform for new radio interface," Agenda Item 7.1.3.1, R1-164265, *3GPP TSG RAN WG1 Meeting #85*, Nanjing, P. R. China, May 23-27, 2016, 6 pages.

* cited by examiner

|  | CP-OFDM | OFDM + Windowing | OFDM + Filtering |
|---|---|---|---|
| OUT-OF-BAND EMISSION | HIGH | MEDIUM | MEDIUM - LOW |
| SINGLE-USER TRANSMISSION QUALITY | GOOD | GOOD | GOOD - WORSE |
| MULTIPLE-USER TRANSMISSION QUALITY (ASYNCHRONOUS ENVIRONMENT, WHEN SUB-RAT WITH DIFFERENT SUBCARRIER INTERVAL IS NEAR) | WORSE | WORSE - GOOD | GOOD |
| PAPR | HIGH | HIGH | HIGH |
| AMOUNT OF ARITHMETIC | LOW | LOW | MEDIUM - HIGH |

FIG. 2

|  | DFT-s-OFDM | DFT-s-OFDM + Windowing | DFT-s-OFDM + Filtering |
|---|---|---|---|
| OUT-OF-BAND EMISSION | HIGH | MEDIUM | MEDIUM - LOW |
| SINGLE-USER TRANSMISSION QUALITY | GOOD | GOOD | GOOD - WORSE |
| MULTIPLE-USER TRANSMISSION QUALITY (ASYNCHRONOUS ENVIRONMENT, WHEN SUB-RAT WITH DIFFERENT SUBCARRIER INTERVAL IS NEAR) | WORSE | WORSE - GOOD | GOOD |
| PAPR | LOW | LOW | LOW - MEDIUM |
| AMOUNT OF ARITHMETIC | LOW | LOW | MEDIUM - HIGH |

FIG. 3 mMTC UPLINK

URLLC

TRANSMISSION APPARATUS, RECEPTION APPARATUS, AND COMMUNICATION METHOD

BACKGROUND

Technical Field

The present disclosure relates to a transmission apparatus, a reception apparatus, and a communication method.

Description of the Related Art

With the recent spread of services using mobile broadband, the data traffic in mobile communication has been exponentially increasing. For this reason, the expansion of data transmission capacity for the upcoming feature has been considered an urgent task. In addition, drastic advancements in Internet of Things (IoT) in which any kind of "things" are connected together via the Internet are expected in the years to come. In order to support diversification of services with IoT, exponential advancements are required not only in the data transmission capacity but also in various requirements such as low latency and communication areas (coverage). With this background in mind, technical development and standardization of the 5th generation mobile communication systems (5G) have been made, which significantly improves the performances and features as compared with the 4th generation mobile communication systems (4G).

Long Term Evolution (LTE)-Advanced, which has been standardized by 3rd generation partnership project (3GPP), is known as a 4G Radio Access Technology (RAT). 3GPP has been making the technical development of a new RAT (NR) not necessarily having backward compatibility with LTE-Advanced in the standardization of 5G.

5G needs to provide support for not only further enhancement of mobile broadband (enhanced Mobile Broadband (eMBB)), but also a massive number of Machine Type Communication (mMTC) terminals as well as support for diversification of services or use cases such as Ultra Reliable and Low Latency Communication (URLLC).

In recent years, for the purpose of enhancing the adaptability and flexibility for diverse use cases of 5G, a signal waveform used in NR has been under study.

Hereinafter, a description will be given of the signal waveform generation technique in LTE and LTE-Advanced, which have been standardized by 3GPP (e.g., see non-Patent Literature (hereinafter, referred to as "NPL") 1 to NPL 3).

Orthogonal Frequency Division Multiplexing (OFDM) has been adopted for the downlink signal waveform of LTE. The reasons for adopting OFDM in downlink include its excellent robustness against frequency-selective fading as well as its high affinity with multilevel modulation and Multiple Input Multiple Output (MIMO). In addition, non-consecutive resource blocks are allocatable in the frequency domain, so that the high resource allocation flexibility and high scheduling effect can be expected in OFDM. OFDM, however, has a problem of high Peak to Average Power Ratio (PAPR).

Meanwhile, Single-Carrier Frequency Division Multiple Access (SC-FDMA) has been adopted for the uplink signal waveform of LTE and LTE-Advanced. SC-FDMA is also called Discrete Fourier Transform (DFT) spread OFDM (DFT-s-OFDM) because SC-FDMA signal waveform can be generated by spreading using DFT. The reasons for adopting DFT-s-OFDM in uplink include its low PAPR, which lead to appropriateness of use of a high power efficient amplifier, and its capability of supporting a large coverage area.

OFDM and DFT-s-OFDM adopted in LTE and LTE-Advanced are advantageous in that they eliminate inter-symbol interference by insertion of a cyclic prefix (CP) and are relatively easily implementable by Fast Fourier Transform (FFT).

Meanwhile, out-of-band emission becomes large in OFDM and DFT-s-OFDM using CP, so that a wide guard band with adjacent bands needs to be secured. In addition, when multiple terminals (User Equipment (UEs)) are asynchronous in the uplink, inter-subcarrier interference may occur, causing performance degradation.

In 5G, it is expected that a symbol length or a subcarrier spacing is changed in accordance with a use case in sub-RATs providing diverse use cases such as eMBB, mMTC, and URLLC. A multiplexing of systems (or sub-RATs) having different symbol lengths or subcarrier spacings in the same frequency carrier causes inter-subcarrier interference between sub-RATs. For this reason, techniques such as insertion of a guard band between sub-RATs are needed in OFDM or DFT-s-OFDM using CP, so that OFDM or DFT-s-OFDM using CP may lack adaptability and flexibility in view of a decrease in spectral efficiency, and support for various use cases required in 5G.

In this respect, while OFDM or DFT-s-OFDM remains considered as the basis of the signal waveform, studies on signal waveforms assuming support for various use cases have been carried out in NR. More specifically, application of filtering or windowing to suppress out-of-band emission after conversion of a frequency-domain signal to a time-domain signal by Inverse Fast Fourier Transform (IFFT) with respect to OFDM or DFT-s-OFDM has been discussed (e.g., see, NPL 4).

Moreover, as a signal waveform used in NR, applying OFDM in downlink, which is the same as LTE, and applying OFDM in uplink as well in order to achieve a high spectral efficiency has been under discussion (e.g., see NPL 5). However, since OFDM has a problem of high PAPR, the coverage becomes small as compared with DFT-s-OFDM adopted in LTE. In addition, in order to achieve as large coverage as DFT-s-OFDM in application of OFDM in uplink, a terminal is required to have a high power efficient amplifier, which leads to an increase in cost of the terminal.

In this respect, as has been proposed in the standardization of LTE-Advanced (e.g., see NPL 6), switching between signal waveforms in accordance with a communication environment, for example, has been proposed in the standardization of NR in 5G (e.g., see NPL 7).

More specifically, in NPL 6, switching between DFT-s-OFDM and OFDM in accordance with the communication environment in uplink is possible. For example, a terminal at the cell edge lacks transmission power, so that the terminal performs communication using DFT-s-OFDM with a low PAPR, while a terminal close to the base station (may be called "eNB") or a terminal connecting with a small cell-size cell has sufficient transmission power, so that the terminal performs communication using OFDM. Switching between DFT-s-OFDM and OFDM can be achieved by directly inputting a modulation signal with respect to an IFFT processing section (corresponding to OFDM) or applying DFT spreading before IFFT processing (corresponding to DFT-s-OFDM).

Meanwhile, NPL 7 discloses, for the purpose of enhancing the adaptability and flexibility for diverse use cases in 5G, as illustrated in FIG. 1, a signal waveform generation method (Flexibly configured OFDM (FC-OFDM)) in which switching is performed between OFDM (multi-carrier mode), DFT-s-OFDM (DFT spreading mode), and Zero-Tail DFT-s-OFDM (ZT spreading mode (ZT-DFT-s-OFDM)) in which zero insertion processing is added to DFT-s-OFDM. Switching between these signal waveforms can be achieved by, as in NPL 6, directly inputting a modulation signal with respect to the IFFT processing section (corresponding to OFDM), applying DFT spreading before IFFT processing (corresponding to DFT-s-OFDM), or applying DFT spreading before IFFT processing and also adding zero-insertion to the processing stage before DFT spreading (corresponding to ZT-DFT-s-OFDM).

For example, in the uplink of eMBB, a terminal performs communication using DFT-s-OFDM with a low PAPR. Meanwhile, for example, in the uplink of a terminal in mMTC where an asynchronous environment among multiple terminals is expected or in a cell edge environment where a propagation delay spread becomes large, the terminal performs communication using ZT-DFT-s-OFDM, which is robust against these environments. In addition, a terminal near the base station or a terminal connecting to a small cell has sufficient transmission power, so that the terminal performs communication using OFDM.

In NPL 7, windowing to suppress out-of-band emission is applied after conversion of a frequency-domain signal to a time-domain signal by IFFT.

CITATION LIST

Non-Patent Literature

NPL 1
3GPP TS 36.211 V13.1.0, "Evolved Universal Terrestrial Radio Access (E-UTRA); Physical channels and modulation (Release 13)," March 2016
NPL 2
3GPP TS 36.212 V13.1.0, "Evolved Universal Terrestrial Radio Access (E-UTRA); Multiplexing and channel coding (Release 13)," March 2016
NPL 3
3GPP TS 36.213 V13.0.0, "Evolved Universal Terrestrial Radio Access (E-UTRA); Physical layer procedures (Release 13)," March 2016
NPL 4
R1-165173, NTT DOCOMO, INC., "Comparison of candidate waveforms," May 2016
NPL 5
R1-164629, Ericsson, "On OFDM in NR," May 2016
NPL 6
R1-081791, Panasonic "Technical proposals and considerations for LTE advanced," May 2008
NPL 7
R1-164619, Orange, "Flexibly configured OFDM (FC-OFDM) waveform," May 2016
NPL 8
V. Vakilian, et al., "Universal-filtered multi-carrier technique for wireless systems beyond LTE," Proc. IEEE Globecom Workshop, December 2013

BRIEF SUMMARY

As described above, FC-OFDM is a signal waveform generation method in which switching is performed only between processing operations (OFDM, DFT-s-OFDM, and ZT-DFT-s-OFDM) in the processing section before IFFT (hereinafter, referred to as "Pre-IFFT section"). Meanwhile, in FC-OFDM, the processing section subsequent to IFFT (hereinafter, referred to as "Post-IFFT section") is fixedly configured with only windowing. Stated differently, in FC-OFDM, flexible processing in accordance with a communication environment with respect to the Post-IFFT processing has not been sufficiently studied.

An aspect of the present disclosure is to provide a transmission apparatus, a reception apparatus, and a communication method capable of appropriately configuring processing of a Post-IFFT section in accordance with a communication environment in signal waveform generation.

A transmission apparatus according to an aspect of the present disclosure includes: an IFFT section that performs IFFT processing on a transmission signal; a control section that determines a signal waveform configuration for the transmission signal after the IFFT processing in accordance with a communication environment of the transmission apparatus; and a Post-IFFT section that performs Post-IFFT processing on the transmission signal after the IFFT processing based on the determined signal waveform configuration.

A reception apparatus according to an aspect of the present disclosure includes: a control section that determines a signal waveform configuration for a signal transmitted from a transmission apparatus, in accordance with a communication environment of the transmission apparatus; a Pre-FFT section that performs Pre-FFT processing on the signal based on the determined signal waveform configuration; and an FFT section that performs FFT processing on the signal after the Pre-FFT processing.

A communication method according to an aspect of the present disclosure includes: performing IFFT processing on a transmission signal; determining a signal waveform configuration for the transmission signal after the IFFT processing in accordance with a communication environment of a transmission apparatus; and performing Post-IFFT processing on the transmission signal after the IFFT processing based on the determined signal waveform configuration.

A communication method according to an aspect of the present disclosure includes: determining a signal waveform configuration for a signal transmitted from a transmission apparatus, in accordance with a communication environment of the transmission apparatus; performing Pre-FFT processing on the signal based on the determined signal waveform configuration; and performing FFT processing on the signal after the Pre-FFT processing.

Note that the comprehensive or specific aspects mentioned above may be implemented by a system, apparatus, method, integrated circuit, computer program, or recoding medium, or any combination of the system, apparatus, method, integrated circuit, computer program, and recoding medium.

According to an aspect of this disclosure, processing of a Post-IFFT section can be appropriately configured in accordance with a communication environment in signal waveform generation.

The specification and drawings reveal more advantages and effects in an aspect of this disclosure. Such advantages and/or effects are provided by the features disclosed in several embodiments as well as the specification and drawings, but all of them do not have to be necessarily provided in order to obtain one or more identical features.

BRIEF DESCRIPTION OF THE SEVERAL VIEWS OF THE DRAWINGS

FIG. 2 is a diagram illustrating exemplary characteristics of OFDM operations;

FIG. 3 is a diagram illustrating exemplary characteristics of DFT-s-OFDM operations;

DETAILED DESCRIPTION

Background to the Present Disclosure

Figure 1:
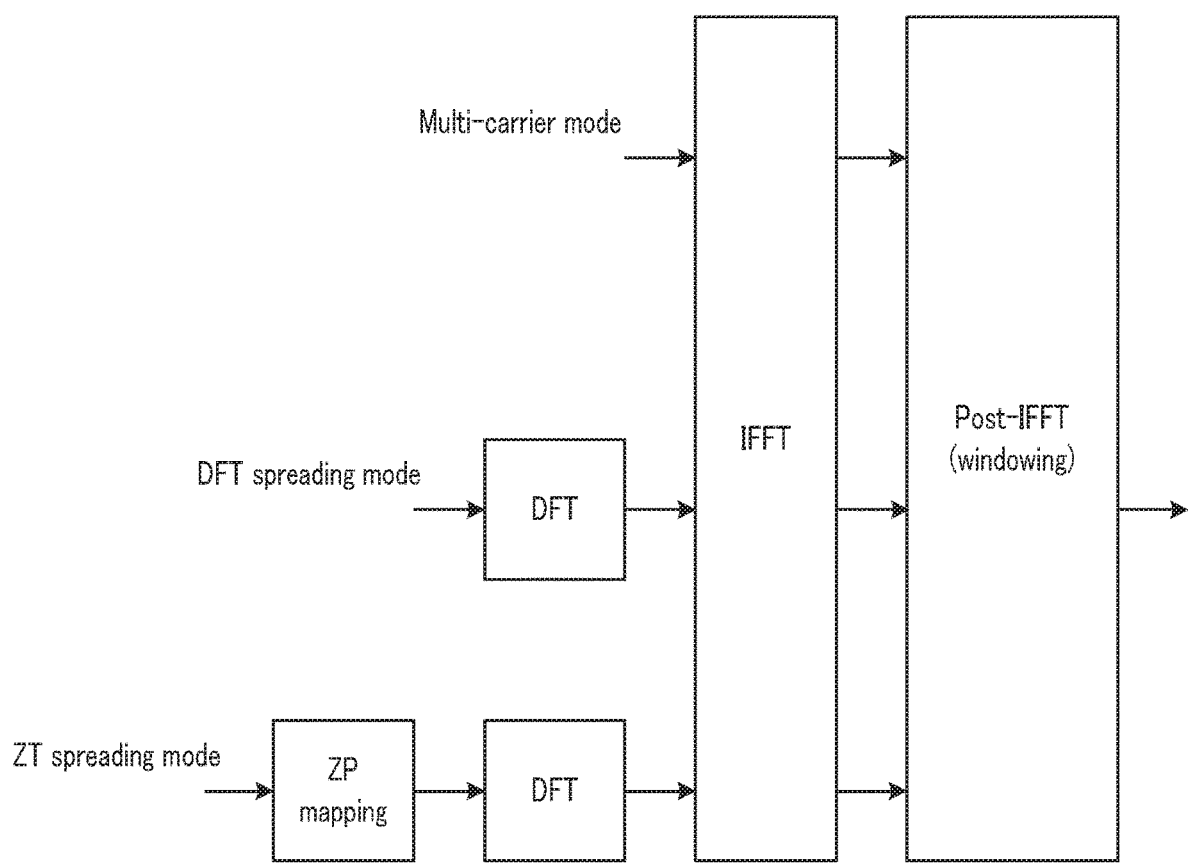
FIG. 1 is a diagram illustrating a configuration example of FC-OFDM.

Hereinafter, a description will be given of the background to the present disclosure.

Windowing and filtering are techniques to enhance the spectral efficiency and/or to suppress the impact of performance degradation due to inter-subcarrier interference by reducing the spreading of a signal waveform in the frequency domain to suppress out-of-band emission, thereby reducing the guard band with adjacent bands.

FIG. 2 illustrates exemplary characteristics (out-of-band emission, single user/multi-user transmission quality, PAPR, and the computational complexity) when OFDM using a CP used in LTE and LTE-Advanced (CP-OFDM; i.e., neither windowing nor filtering), OFDM using windowing (OFDM+Windowing), and OFDM using filtering (OFDM+Filtering) are used. In addition, FIG. 3 illustrates exemplary characteristics when DFT-s-OFDM using a CP used in LTE and LTE-Advanced (i.e., neither windowing nor filtering), DFT-s-OFDM using windowing (DFT-s-OFDM+Windowing), and DFT-s-OFDM using filtering (DFT-s-OFDM+Filtering) are used. Note that, in FIGS. 2 and 3, an assumption is made that a method in which filtering is performed in units of subbands as typified in Universal Filtered OFDM (UF-OFDM) (e.g., see NPL 8) is used for filtering.

Windowing can suppress out-of-band emission with low computational complexity compared with filtering, but the effect of applying windowing depends on the length of windowing function, or propagation delay. Moreover, in general, the effect of suppressing out-of-band emission by windowing is not as high as that obtained by filtering. Stated differently, as illustrated in FIGS. 2 and 3, although filtering involves an increase in the computational complexity as compared with windowing, the effect of suppressing the out-of-band emission is large in general.

Furthermore, windowing and filtering can suppress spreading of a signal waveform in the frequency domain (suppressing out-of-band emission), but instead, gives an impact on the multi-dimensional features such as PAPR, transmission quality in a single user environment, and the computational complexity of transmission and reception apparatuses, for example. In other words, it is difficult to simultaneously satisfy the characteristics as illustrated in FIGS. 2 and 3 to have favorable properties, when windowing and filtering are applied.

In this respect, an object of an aspect of the present disclosure is to appropriately configure parameters in accordance with diverse use cases in 5G when windowing or filtering is used in a Post-IFFT section in signal waveform generation. Stated differently, an aspect of the present disclosure aims to efficiently determine a signal waveform in accordance with a communication environment.

Hereinafter, a detailed description will be given of embodiments of the present disclosure with reference to the drawings.

Embodiment 1

Summary of Communication System

A communication system according to each embodiment of the present disclosure includes base station 100 and terminal 200.

Figure 4:
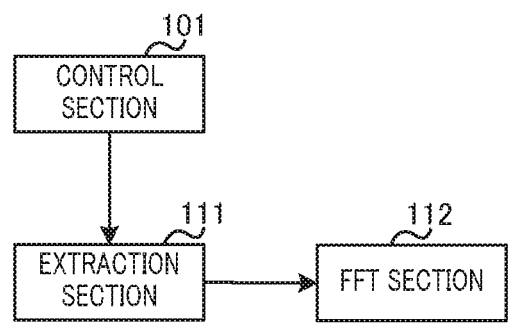
FIG. 4 is a block diagram illustrating a main configuration of a base station according to Embodiment 1.

FIG. 4 is a block diagram illustrating a main configuration of base station 100 according to each embodiment of this disclosure. In base station 100 illustrated in FIG. 4, control section 101 determines a signal waveform configuration for a signal transmitted from terminal 200 in accordance with a communication environment of terminal 200 (transmission apparatus); extraction section 111 (corresponding to the Pre-FFT section) performs Pre-FFT processing on a signal before FFT processing based on the determined signal waveform configuration; and FFT section 112 performs FFT processing on the signal after the Pre-FFT processing.

Figure 5:
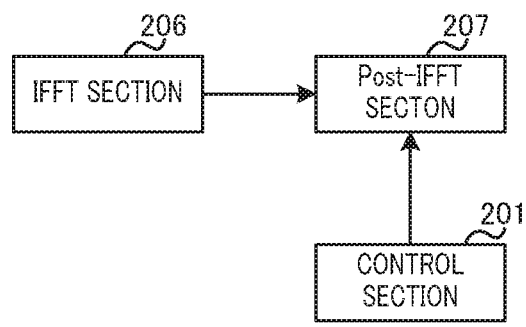
FIG. 5 is a block diagram illustrating a main configuration of a terminal according to Embodiment 1.

FIG. 5 is a block diagram illustrating a main configuration of terminal 200 according to each embodiment of the present disclosure. In terminal 200 illustrated in FIG. 5, IFFT section 206 performs IFFT processing on a transmission signal; control section 201 determines a signal waveform configuration for the transmission signal after the IFFT processing in accordance with a communication environment of terminal 200 (transmission apparatus); and Post-IFFT section 207 performs Post-IFFT processing on the transmission signal after the IFFT processing based on the determined signal waveform configuration.

Note that, although FIGS. 4 and 5 illustrate uplink transmission and reception processing (when terminal 200 is the transmission apparatus), this disclosure can be applied likewise to downlink transmission and reception processing (when base station 100 is the transmission apparatus).

Configuration of Base Station

Figure 6:
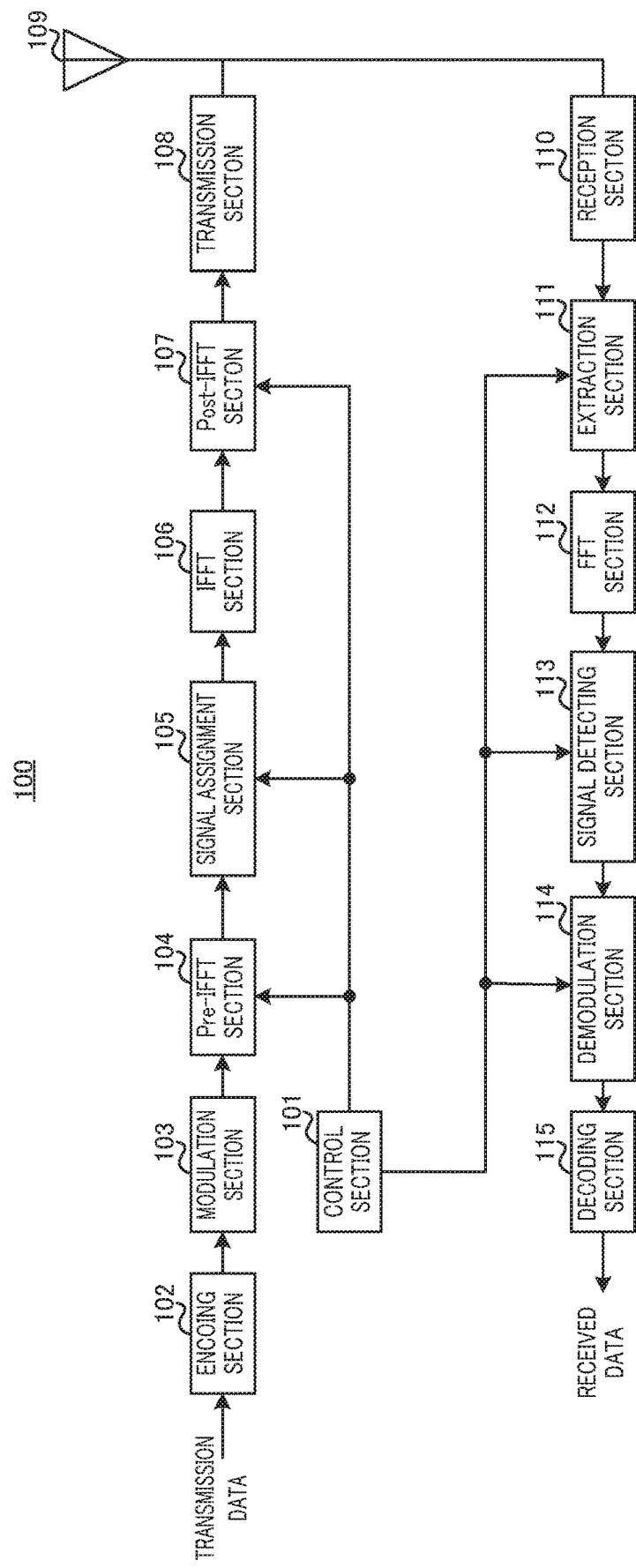
FIG. 6 is a block diagram illustrating a configuration of the base station according to Embodiment 1.

FIG. 6 is a block diagram illustrating a configuration of base station 100 according to Embodiment 1 of the present disclosure. In FIG. 6, base station 100 includes control section 101, encoding section 102, modulation section 103, Pre-IFFT section 104, signal assignment section 105, IFFT section 106, Post-IFFT section 107, transmission section 108, antenna 109, reception section 110, extraction section 111, FFT section 112, signal detecting section 113, demodulation section 114, and decoding section 115.

Control section 101 determines information about a downlink or uplink signal waveform for terminal 200 (e.g., information about a communication environment of base station 100 or terminal 200). Control section 101 determines a signal waveform configuration for downlink transmission (e.g., processing of Pre-IFFT section 104 and Post-IFFT section 107) based on the information about the determined downlink signal waveform, and outputs configuration information indicating the determined signal waveform configuration (processing contents) to Pre-IFFT section 104 and Post-IFFT section 107. In addition, control section 101 determines a signal waveform configuration for uplink reception (e.g., processing corresponding to Pre-IFFT processing and Post-IFFT processing in terminal 200) based on the information about the determined uplink signal waveform and outputs the configuration information indicating the determined signal waveform configuration (processing contents) to extraction section 111, signal detecting section 113, and demodulation section 114. Moreover, control section 101 indicates the information about the determined signal waveform to terminal 200 in accordance with a predetermined indication method (to be described hereinafter in detail).

Moreover, control section 101 determines resource allocation (such as allocation band and allocation bandwidth) for terminal 200 and outputs resource allocation information indicating the determined radio resource to signal assignment section 105 and signal detecting section 113. Moreover, control section 101 indicates the determined resource allocation information to terminal 200 (control section 201) via a downlink control signal or UE-specific higher-layer signaling (not illustrated).

Encoding section 102 encodes transmission data (downlink data) and outputs the coded bit sequence thus obtained to modulation section 103.

Modulation section 103 modulates the coded bit sequence inputted from encoding section 102 and outputs the modulation symbol sequence thus obtained to Pre-IFFT section 104.

Pre-IFFT section 104 performs the Pre-IFFT processing indicated by the configuration information received from control section 101 on the modulation symbol sequence inputted from modulation section 103 and outputs the signal after the Pre-IFFT processing to signal assignment section 105. For example, when OFDM used in downlink of LTE and LTE-Advanced is indicated, Pre-IFFT section 104 outputs the modulation symbol sequence to signal assignment section 105 without performing any processing on the modulation symbol sequence. Meanwhile, when DFT-s-OFDM used in uplink of LTE and LTE-Advanced is indicated, pre-IFFT section 104 performs DFT spreading processing and outputs the sequence after the DFT spreading processing to signal assignment section 105.

Signal assignment section 105 maps the signal inputted from Pre-IFFT section 104 to the radio resource indicated by control section 101. Signal assignment section 105 outputs, to IFFT section 106, the downlink signal to which the signal has been mapped.

IFFT section 106 performs IFFT processing for conversion of a frequency-domain signal to a time-domain signal on the signal inputted from signal assignment section 105. IFFT section 106 outputs the time-domain signal after the IFFT processing to Post-IFFT section 107.

Post-IFFT section 107 performs the Post-IFFT processing indicated by the configuration information received from control section 101 on the signal after the IFFT processing inputted from IFFT section 106 and outputs the signal after the Post-IFFT processing to transmission section 108. For example, when OFDM or DFT-s-OFDM used in LTE and LTE-Advanced is indicated, Post-IFFT section 107 performs processing to insert a CP on the signal inputted from IFFT section 106. Moreover, when windowing or filtering is indicated, Post-IFFT section 107 performs windowing or filtering on the signal inputted from IFFT section 106.

Transmission section 108 performs radio frequency (RF) processing such as digital-to-analog (D/A) conversion and/or up-conversion on the signal inputted from Post-IFFT section 107 and outputs the radio signal to terminal 200 via antenna 109.

Reception section 110 performs RF processing such as down-conversion or analog-to-digital (A/D) conversion on the signal waveform of the uplink signal received from terminal 200 via antenna 109 and outputs the received signal thus obtained to extraction section 111.

Extraction section 111 performs processing (CP removal, windowing or filtering or the like, may be called "Pre-FFT processing") corresponding to the Post-IFFT configuration for the signal waveform transmitted from terminal 200 on the received signal (i.e., the signal before FFT processing) based on the configuration information received from control section 101, then extracts a radio resource portion in which the signal from terminal 200 is transmitted, and outputs the extracted received signal to FFT section 112.

FFT section 112 performs FFT processing for conversion of a time-domain signal to a frequency-domain signal on the signal inputted from extraction section 111 (time-domain signal, i.e., the signal after the Pre-FFT processing). FFT section 112 outputs the frequency-domain signal thus obtained by the FFT processing to signal detecting section 113.

Signal detecting section 113 performs equalization processing corresponding to the signal waveform transmitted from terminal 200 on the signal inputted from FFT section 112 based on the configuration information and resource allocation information received from control section 101 and outputs the signal after the equalization processing to demodulation section 114.

Demodulation section 114 performs demodulation processing (may be called "Post-FFT processing") corresponding to the signal waveform transmitted from terminal 200 on the signal inputted from signal detecting section 113 based on the configuration information received from control section 101 and outputs the demodulated signal to decoding section 115. For example, when terminal 200 (Pre-IFFT section 204 to be described hereinafter) transmits the signal after performing DFT spreading as the Pre-IFFT processing on the signal, demodulation section 114 performs Inverse Discrete Fourier Transform (IDFT) processing on the signal.

Decoding section 115 performs error correction decoding processing on the signal inputted from demodulation section 114 to obtain a received data sequence (uplink data).

Configuration of Terminal

Figure 7:
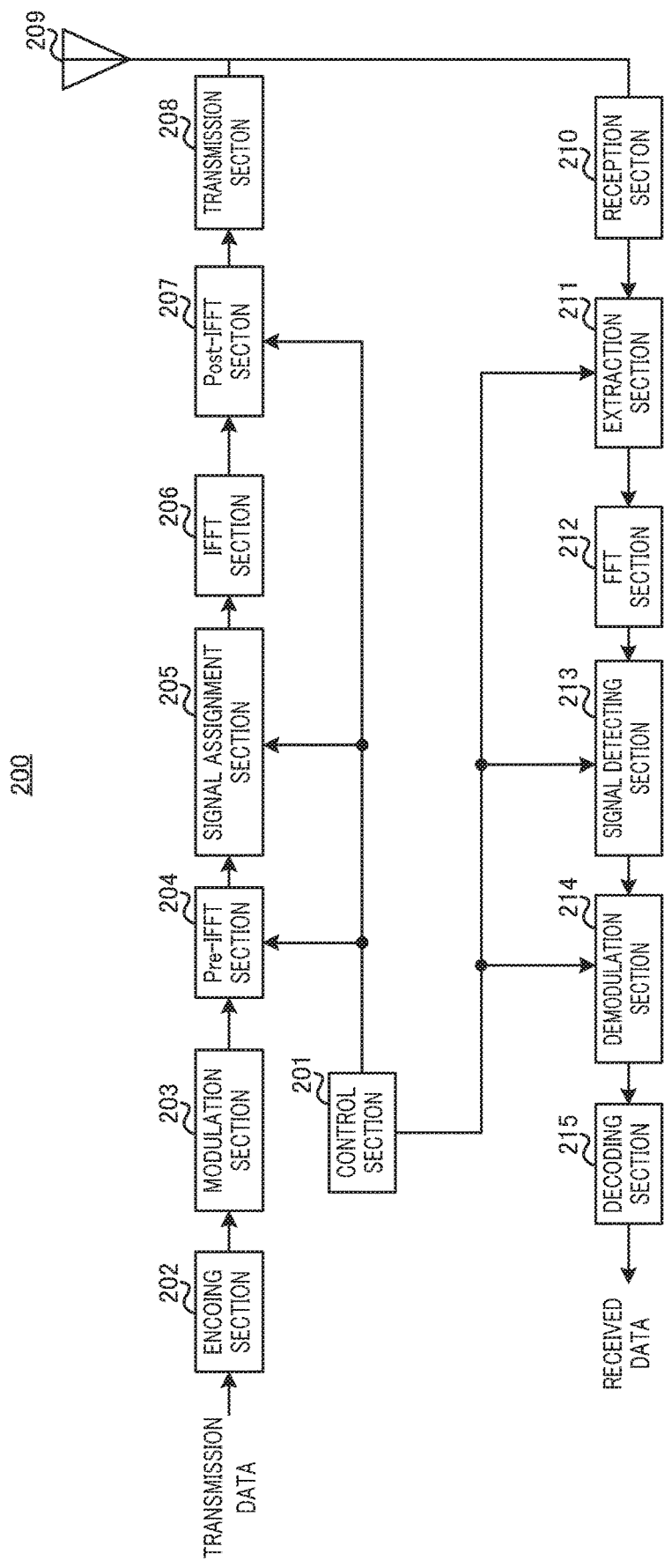
FIG. 7 is a block diagram illustrating a configuration of the terminal according to Embodiment 1.

FIG. 7 is a block diagram illustrating a configuration of terminal 200 according to Embodiment 1 of the present disclosure. In FIG. 7, terminal 200 includes control section 201, encoding section 202, modulation section 203, Pre-IFFT section 204, signal assignment section 205, IFFT section 206, Post-IFFT section 207, transmission section 208, antenna 209, reception section 210, extraction section 211, FFT section 212, signal detecting section 213, demodulation section 214, and decoding section 215.

Control section 201 receives information about a downlink or uplink signal waveform and resource allocation information from base station 100 (control section 101) via a downlink control signal (downlink control information (DCI)) or UE-specific higher-layer signaling (not illustrated), for example.

Control section 201 determines a signal waveform configuration for downlink reception (e.g., processing corresponding to Pre-IFFT processing and Post-IFFT processing in base station 100) based on the information about the downlink signal waveform indicated by base station 100 (control section 101) and outputs the configuration information indicating the determined signal waveform configuration (processing contents) to extraction section 211, signal detecting section 213 and demodulation section 214. In addition, control section 201 determines a signal waveform configuration for uplink transmission (e.g., processing of Pre-IFFT section 204 and Post-IFFT section 207) based on the information about the uplink signal waveform and outputs the configuration information indicating the determined signal waveform configuration (processing contents) to Pre-IFFT section 204 and Post-IFFT section 207.

Moreover, control section 201 identifies the radio resource for transmitting the uplink signal based on the resource allocation information indicated by base station 100 (control section 101) and outputs the information about the radio resource to signal assignment section 205. Control section 201 identifies the radio resource for receiving the downlink signal based on the resource allocation information and outputs the information about the radio resource to signal detecting section 213.

Encoding section 202 encodes transmission data (uplink data) and outputs the coded bit sequence thus obtained to modulation section 203.

Modulation section 203 modulates the coded bit sequence inputted from encoding section 202 and outputs the modulation symbol sequence thus obtained to Pre-IFFT section 204.

Pre-IFFT section 204 performs Pre-IFFT processing indicated by the configuration information received from control section 201 on the modulation symbol sequence inputted from modulation section 203 and outputs the signal after the Pre-IFFT processing to signal assignment section 205. For example, when OFDM used in downlink of LTE and LTE-Advanced is indicated, Pre-IFFT section 204 outputs the modulation symbol sequence to signal assignment section 205 without performing any processing on the modulation symbol sequence. Moreover, when DFT-s-OFDM used in uplink of LTE and LTE-Advanced is indicated, Pre-IFFT section 204 performs DFT spreading processing and outputs the sequence after the DFT spreading to signal assignment section 205.

Signal assignment section 205 maps the signal inputted from Pre-IFFT section 204 to the radio resource indicated by control section 201. Signal assignment section 205 outputs, to IFFT section 206, the uplink signal to which the signal has been mapped.

IFFT section 206 performs IFFT processing for conversion of a frequency-domain signal to a time-domain signal on the signal inputted from signal assignment section 205. IFFT section 206 outputs the time-domain signal after the IFFT processing to Post-IFFT section 207.

Post-IFFT section 207 performs the Post-IFFT processing indicated by the configuration information received from control section 201 on the signal after the IFFT processing inputted from IFFT section 206 and outputs the signal after the Post-IFFT processing to transmission section 208. For example, when OFDM or DFT-s-OFDM used in LTE and LTE-Advanced is indicated, Post-IFFT section 207 performs processing to insert CP on the signal inputted from IFFT section 206. Moreover, when windowing or filtering is indicated, Post-IFFT section 207 performs windowing or filtering on the signal inputted from IFFT section 206.

Transmission section 208 performs radio frequency (RF) processing such as digital-to-analog (D/A) conversion and/or up-conversion on the signal inputted from Post-IFFT section 207 and outputs the radio signal to base station 100 via antenna 209.

Reception section 210 performs RF processing such as down-conversion or analog-to-digital (A/D) conversion on the signal waveform of the downlink signal received from base station 100 via antenna 209 and outputs the received signal thus obtained to extraction section 211.

Extraction section 211 performs processing (windowing or filtering or the like, i.e., Pre-FFT processing) corresponding to the Post-IFFT configuration for the signal waveform transmitted from base station 100 on the received signal (i.e., the signal before FFT processing) based on the configuration information received from control section 201, then extracts a radio resource portion in which the signal from base station 100 is transmitted, and outputs the extracted received signal to FFT section 212.

FFT section 212 performs FFT processing for conversion of a time-domain signal to a frequency-domain signal on the signal inputted from extraction section 211 (time-domain signal, i.e., the signal after the Pre-FFT processing). FFT section 212 outputs the frequency-domain signal thus obtained by the FFT processing to signal detecting section 213.

Signal detecting section 213 performs equalization processing corresponding to the signal waveform transmitted from base station 100 on the signal inputted from FFT section 212 based on the configuration information and resource allocation information received from control section 201 and outputs the signal after the equalization processing to demodulation section 214.

Demodulation section 214 performs demodulation processing (Post-FFT processing) corresponding to the signal waveform transmitted from base station 100 on the signal inputted from signal detecting section 213 based on the configuration information received from control section 201 and outputs the demodulated signal to decoding section 215. For example, when base station 100 (Pre-IFFT section 104) transmits the signal after performing DFT spreading as the Pre-IFFT processing, demodulation section 214 performs IDFT processing on the signal.

Decoding section 215 performs error correction decoding processing on the signal inputted from demodulation section 214 to obtain a received data sequence (downlink data).

Operations of Base Station 100 and Terminal 200

Hereinafter, a detailed description will be given of operations of base station 100 and terminal 200 each having the above described configuration.

Hereinafter, a method of determining a signal waveform configuration by base station 100 and terminal 200 in accordance with a specific use case in 5G will be described.

mMTC Use Case

The radio access technologies up to 4G typified by LTE and LTE-Advanced have been designed while mainly targeting MBB, but 5G needs to support use cases targeting the IoT. In particular, in use cases of mMTC supporting a massive number of sensor terminals, low-cost terminals as compared with smartphones and tablet terminals are required. For this reason, there arises a concern that the power supply capacity of the terminals may be reduced, resulting in a reduced operating time.

In this respect, in order to increase the operating time of the terminals, reducing a control signal such as a synchronization signal has been examined. In this case, a terminal not completely in synchronization with a base station exists between the base station and terminals, so that support for uplink communication for asynchronous state terminals is required.

When a base station receives signals asynchronously from multiple terminals, inter-subcarrier interference occurs. For this reason, when a terminal transmits a signal in a signal waveform having large out-of-band emission, the transmission performance degrades significantly. In order to prevent such degradation of the transmission performance, a wide guard band needs to be secured with a terminal allocated to an adjacent band, but the securing of a guard band leads to a decrease in spectral efficiency.

Figure 8A:
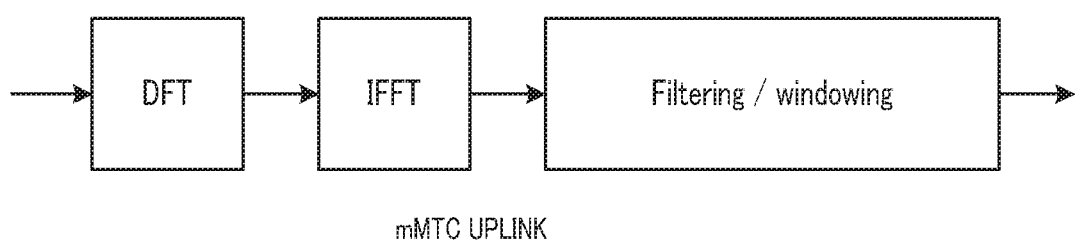
FIG. 8A is a diagram illustrating an operation example of signal waveform generation in mMTC according to Embodiment 1.

In this respect, in Embodiment 1, as illustrated in FIG. 8A, base station 100 determines application of filtering or windowing as a signal wave configuration (Post-IFFT processing) in terminal 200 (Post-IFFT section 207) in order to efficiently support communication while terminals are in an asynchronous state in the uplink communication of an mMTC use case. In other words, terminal 200 (Post-IFFT section 207) generates a signal waveform by applying filtering or windowing in uplink communication when multiple terminals 200 operate asynchronously (mMTC use case, herein).

Generating a signal waveform by applying filtering or windowing by terminal 200 in an mMTC use case makes it possible to suppress out-of-band emission in the uplink signal waveform. Thus, even when base station 100 receives signals asynchronously from multiple terminals 200, it is possible to prevent degradation of the transmission performance due to inter-subcarrier interference.

In addition, since the out-of-band emission in the uplink signal waveform is suppressed by Post-IFFT processing (filtering or windowing), no wide guard band needs to be secured between allocation bands of multiple terminals 200, so that the spectral efficiency may be improved.

Note that, in the uplink communication in an mMTC use case, it is desirable to apply DFT spreading which allows for use of a high power efficient amplifier as illustrated in FIG. 8A, but the processing of Pre-IFFT section 204 is not limited to this.

URLLC Use Case 5G includes URLLC, which requires low-latency and high-reliability, as a use case targeting the IoT. In URLLC, it is desirable to reduce the signal processing latency in terminals and base stations. In addition, in order to achieve low latency, communication needs to be performed using as small a number of symbols as possible. However, communication using a small number of symbols makes it difficult to secure coverage, and preventing a degradation of transmission performance by obtaining a frequency diversity gain is considered in this case. Accordingly, broadband communication is expected in URLLC.

Meanwhile, filtering increases the complexity of signal processing (the computational complexity) as the signal bandwidth becomes broader in general.

Figure 8B:
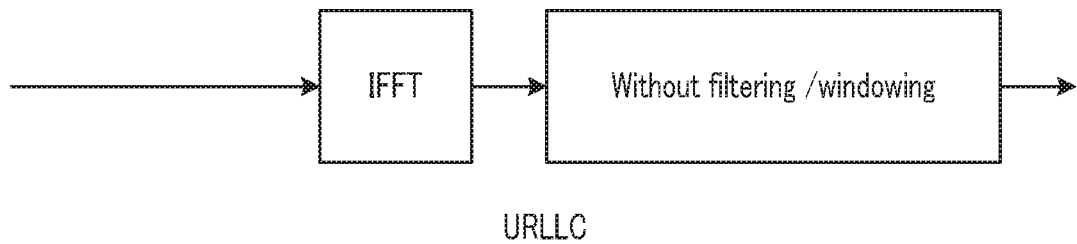
FIG. 8B is a diagram illustrating an operation example of signal waveform generation in URLLC according to Embodiment 1.

In this respect, in Embodiment 1, in a URLLC use case where broadband communication is expected and low latency communication is required, base station 100 and terminal 200 determine not to apply filtering as the signal waveform configuration (Pre-IFFT processing) in Post-IFFT sections 107 and 207 as illustrated in FIG. 8B. More specifically, base station 100 (Post-IFFT section 107) and terminal 200 (Post-IFFT section 207) generate a signal waveform without applying filtering in communication in URLLC use cases.

Generating a signal waveform without applying filtering by Post-IFFT sections 107 and 207 in URLLC use cases makes it possible to suppress an increase in the computational complexity required for the processing to generate a signal waveform, and thus to reduce the signal processing latency in broadband communication. Thus, the low latency and high reliability can be achieved in URLLC.

Note that, in general, windowing requires signal processing in the time domain, so that the computational complexity of windowing does not depend on the signal bandwidth (i.e., frequency-domain parameter). Accordingly, the computational complexity of windowing in broadband communication is small as compared with filtering. For this reason, base station 100 and terminal 200 may apply windowing in Pre-IFFT sections 107 and 207 in URLLC use cases. The application of windowing makes it possible to suppress an increase in the computational complexity and also to suppress the out-of-band emission to a relatively low level. Accordingly, there is an advantage in that the securing of a wide guard band between sub-RATs is no longer required in an environment where sub-RATs having different subcarrier spacings exist, for example.

Moreover, in URLLC use cases, as illustrated in FIG. 8B, a multi-carrier mode in which no DFT spreading is applied is desirable in order to obtain a frequency diversity gain with a small number of symbols in Pre-IFFT section 104 of base station 100 and Pre-IFFT section 204 of terminal 200, but the processing of Pre-IFFT sections 104 and 204 is not limited to this.

The method of configuring a signal waveform in accordance with the 5G-specific use cases has been described thus far.

Note that, the corresponding relationship between the use cases (mMTC or URLLC) and the signal waveform configurations may be previously defined. For example, when mMTC is indicated as the information relating to the signal waveform, base station 100 and terminal 200 may perform processing based on the signal waveform configuration illustrated in FIG. 8A, and when URLLC is indicated as the information about the signal waveform, base station 100 and terminal 200 may perform processing based on the signal waveform configuration illustrated in FIG. 8B.

As described above, in Embodiment 1, base station 100 and terminal 200 can appropriately configure parameters in accordance with diverse use cases in 5G when windowing or filtering is used in Post IFFT-sections 107 and 207 in signal waveform generation. To put is differently, base station 100 and terminal 200 switch between specific processing operations in accordance with use cases, thereby making it possible to appropriately configure processing of Post IFFT-sections 107 and 207 in accordance with the diverse use cases in 5G.

Embodiment 2

In Embodiment 2, a description will be given of a method of appropriately determining a signal waveform configuration when a terminal supports multiple use cases.

Note that, the basic configurations of a base station and a terminal according to Embodiment 2 are common to those of base station 100 and terminal 200 according to Embodiment 1, so that the description will be given with reference to FIGS. 6 and 7.

As described above, in 5G, it is desirable to flexibly support diverse use cases such as eMBB, mMTC, and URLLC. In sub-RATs providing the use cases, it is expected to change the symbol length or subcarrier spacing in accordance with the use cases. In addition, it is expected that the terminal can support multiple use cases and multiple sub-RATs.

Each use case has a different requirement, so that it is desirable for terminals to be capable of flexibly generating a signal waveform assuming various use cases.

Figure 9:
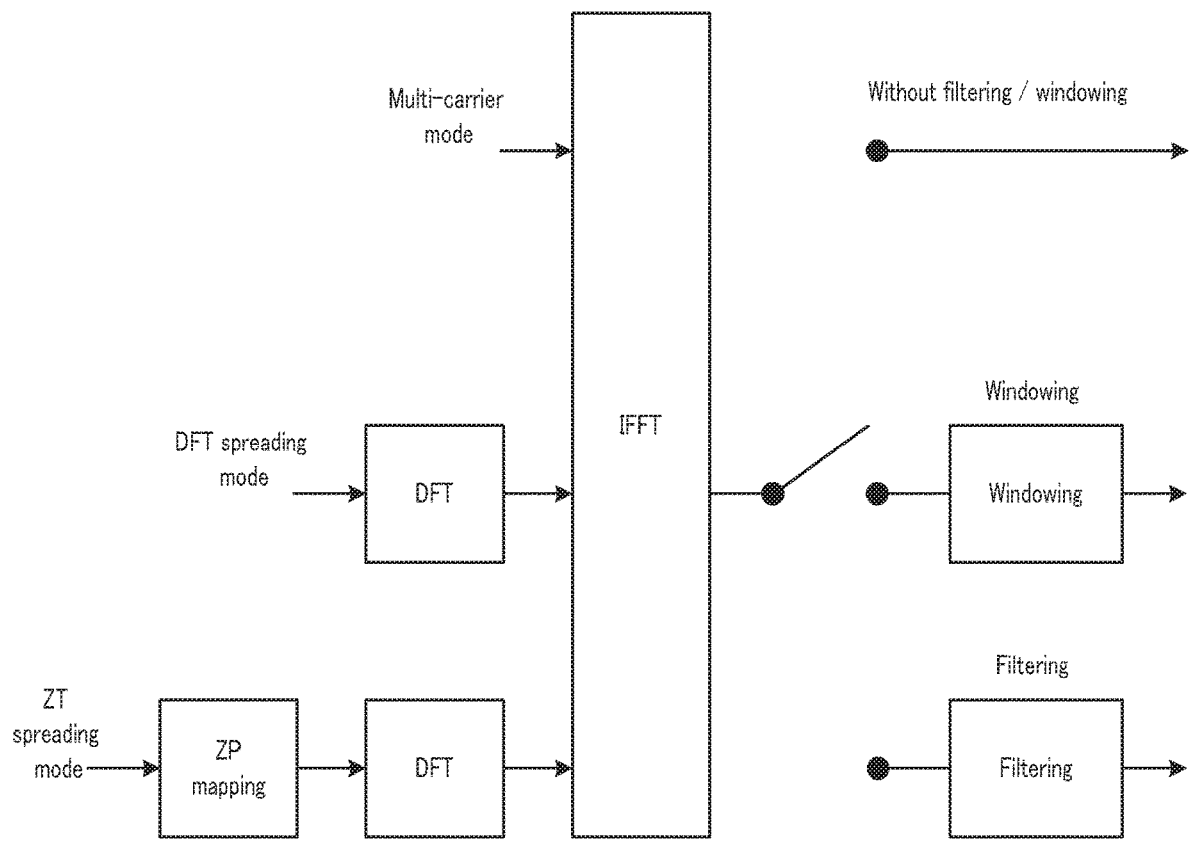
FIG. 9 is a diagram illustrating an operation example of signal waveform generation according to Embodiment 2.

In this respect, in Embodiment 2, as illustrated in FIG. 9, base station 100 and terminal 200 are allowed to have multiple configurations (modes) for Post-IFFT sections 107 and 207 and generate a signal waveform while switching between the configurations of Post-IFFT sections 107 and 207 in accordance with the sub-RAT or the use case of the sub-RAT.

In FIG. 9, base station 100 (control section 101) and terminal 200 (control section 201) determine signal waveform configurations of Post-IFFT sections 107 and 207 while switching between application of neither filtering nor windowing, application of windowing, and application of filtering in accordance with use cases. For example, in an mMTC use case (i.e., when multiple terminals 200 operate asynchronously), base station 100 and terminal 200 may determine to apply filtering or windowing and generate a signal waveform. In addition, in a URLLC use case (i.e., when broadband communication or low latency communication is required), base station 100 and terminal 200 may determine neither to apply filtering nor windowing or to apply windowing and generate a signal waveform.

Accordingly, base station 100 and terminal 200 can perform Post-IFFT processing appropriate to the communication environment of each use case.

Moreover, for Pre-IFFT sections 104 and 204 as well, base station 100 and terminal 200 are allowed to have multiple configurations (modes) for Pre-IFFT sections 104 and 204 and generate a signal waveform while switching between the configurations of Post-IFFT sections 104 and 204 in accordance with the sub-RAT or the use case of the sub-RAT.

In FIG. 9, base station 100 (control section 101) and terminal 200 (control section 201) determine a signal waveform configuration of Pre-IFFT sections 104 and 204 while switching between the multi-carrier mode (no DFT spreading), DFT spreading mode, and ZT spreading mode in accordance with the use case. For example, base station 100 and terminal 200 may configure the DFT spreading mode and generate a signal waveform in an mMTC use case, while base station 100 and terminal 200 may configure the multi-carrier mode and generate a signal waveform in a URLLC use case.

Note that, the signal waveform configurations of Post-IFFT sections 107 and 207 and Pre-IFFT sections 104 and 204 may be previously defined in accordance with specific use cases such as eMBB, mMTC, and URLLC, or sub-RATs.

In addition, base station 100 may indicate, to terminal 200, the signal waveform configuration of Post-IFFT sections 107 and 207 and the signal waveform configuration of Pre-IFFT sections 104 and 204 via higher-layer signaling such as a radio resource control (RRC) signal. For example, when a common use case is provided in a single cell, base station 100 may indicate, to terminal 200 within the cell, a signal waveform configuration common in the cell for Post-IFFT processing and Pre-IFFT processing using a cell-specific RRC signal.

Meanwhile, when multiple use cases are provided in a single cell, base station 100 may indicate, to terminal 200 within the cell, multiple signal waveform configurations in the cell for Post-IFFT processing and Pre-IFFT processing using the cell-specific RRC signal. When a sub-RAT-specific RRC signal is defined, base station 100 may indicate, to terminal 200, the signal waveform configurations for the Post-IFFT processing and Pre-IFFT processing in the sub-RAT, using a sub-RAT-specific RRC signal. Moreover, base station 100 may indicate, to each terminal 200, the signal waveform configuration for the Post-IFFT processing and Pre-IFFT processing, using a terminal-specific (UE-specific) RRC signal.

Meanwhile, when the signal waveform configurations for the Post-IFFT processing and Pre-IFFT processing are indicated using the RRC signaling, terminal 200 cannot generate a signal waveform based on the signal waveform configurations until reception of the RRC signal. Accordingly, for a signal required for transmission and reception before reception of the RRC signal (e.g., common channels such as synchronization signal, broadcast signal, and random access signal), terminal 200 may generate a signal waveform based on the previously defined signal waveform configurations for the Post-IFFT processing and Pre-IFFT processing, and for a signal after reception of the RRC signal (e.g., unicast channel), terminal 200 may generate a signal waveform based on the signal waveform configurations for the Post-IFFT processing and Pre-IFFT processing indicated via the RRC signal.

As described above, according to Embodiment 2, base station 100 and terminal 200 can generate a signal waveform while flexibly switching between signal waveform configurations in accordance with use cases. Stated differently, base station 100 and terminal 200 can perform communication by generating, for each use case having a different requirement, a signal waveform based on a configuration appropriate for each use case among multiple configurations of Post-IFFT sections and Pre-IFFT sections different in characteristics.

Note that, regarding the signal waveform configurations of Post-IFFT sections 107 and 207, three configurations including one in which neither windowing nor filtering is applied, one in which windowing is applied, and one in which filtering is applied are illustrated in FIG. 9, but the signal waveform configurations of Post-IFFT sections 107 and 207 are not limited to these three configurations. For example, regarding the filtering, multiple filtering methods (e.g., subband-based filtering and subcarrier-based filtering or the like) may be included in the configurations or multiple parameters for filtering or windowing (filtering coefficient, filter length, and/or the like) may be included in the configurations. Thus, base station 100 and terminal 200 can more flexibly switch between signal waveform configurations.

Embodiment 3

The basic configurations of a base station and a terminal according to Embodiment 3 are common to those of base station 100 and terminal 200 according to Embodiment 1, so that a description will be given with reference to FIGS. 6 and 7.

In Embodiment 3, a description will be given of a method of appropriately determining a signal waveform configuration in accordance with an allocation bandwidth used by a terminal for transmission and reception of signals.

As a filtering technique, there is a signal waveform technique in which time-domain filtering is applied in units of subbands formed by grouping multiple subcarriers. In the filtering in units of subbands, a system bandwidth is divided into multiple subbands, and after a filter is applied to each of the subbands, the signals are combined to generate a signal waveform. At this time, when an allocation bandwidth is large for the bandwidth of the subband (subband size), filtering processing needs to be performed after dividing the allocation band into multiple subbands, so that there is an increase in the computational complexity.

In order to reduce the computational complexity, filtering may be performed with an increased subband size when the allocation bandwidth is large. However, when a filter for a large subband size is designed, there is a trade-off relationship between out-of-band emission and in-band distortion in general. More specifically, an increase in the effect of suppressing the out-of-band emission makes it possible to suppress the impact of inter-subcarrier interference but causes an increase in in-band distortion, thus degrading the transmission performance due to the impact of inter-symbol interference. Meanwhile, an increase in the effect of reducing the in-band distortion causes an increase in the out-of-band emission, thus degrading the transmission performance due to the impact of inter-subcarrier interference.

In this respect, in Embodiment 3, base station 100 and terminal 200 are allowed to have multiple configurations (modes) for Pre-IFFT sections 107 and 207, and determine the signal waveform configuration of Pre-IFFT sections 107 and 207 in accordance with an allocation bandwidth allocated to communication of base station 100 and terminal 200.

For example, base station 100 (control section 101) and terminal 200 (control section 201) previously configure a threshold for allocation bandwidth, and when the allocation bandwidth is less than the threshold, base station 100 (control section 101) and terminal 200 (control section 201) determine to apply filtering as the signal waveform configuration of Post-IFFT sections 107 and 207. Accordingly, base station 100 and terminal 200 can transmit a signal waveform while suppressing an increase in the computational complexity, and the out-of-band emission.

Meanwhile, when the allocation bandwidth is equal to or greater than the threshold, base station 100 and terminal 200 determine not to apply filtering or determine to apply windowing as the signal waveform configuration of Post-IFFT sections 107 and 207. Accordingly, base station 100 and terminal 200 can transmit the signal waveform while suppressing an increase in the computational complexity.

For Pre-IFFT sections 104 and 204 as well, base station 100 and terminal 200 are allowed to have multiple configurations (modes) for Pre-IFFT sections 104 and 204, and switch between the configurations of Pre-IFFT sections 104 and 204 in accordance with an allocation bandwidth and generate a signal waveform.

The signal waveform configuration of Post-IFFT sections 107 and 207 or Pre-IFFT sections 104 and 204, and the information about the allocation bandwidth used in the signal waveform configuration (hereinafter, referred to as "allocation bandwidth information") may be previously defined.

In addition, the signal waveform configuration of Post-IFFT sections 107 and 207 or Pre-IFFT sections 104 and 204 and the allocation bandwidth information may be indicated to terminal 200 from base station 100 via higher-layer signaling such as an RRC signal. For example, when a common signal waveform configuration and allocation bandwidth information are used in a single cell, base station 100 indicates, to terminals 200 in the cell, the signal waveform configuration and allocation bandwidth information for the Post-IFFT processing or Pre-IFFT processing, using a cell-specific RRC signal.

Meanwhile, multiple signal waveform configurations and allocation bandwidth information for Post-IFFT processing or Pre-IFFT processing in a single cell are provided, base station 100 may indicate, to terminals 200 in the cell, the multiple signal waveform configurations and allocation bandwidth information in the cell for the Post-IFFT processing or Pre-IFFT processing, using a cell-specific RRC signal. Moreover, when a sub-RAT-specific RRC signal is defined, base station 100 may indicate, to terminals 200, the signal waveform configuration and allocation bandwidth information for the Post-IFFT processing or Pre-IFFT processing in the sub-RAT, using a sub-RAT-specific RRC signal. Moreover, base station 100 may indicate, to each terminal 200, the signal waveform configuration and allocation bandwidth information for the Post-IFFT processing or Pre-IFFT processing, using a terminal-specific RRC signal.

When the signal waveform configuration for the Post-IFFT processing or Pre-IFFT processing is indicated using the RRC signal, terminal 200 cannot generate a signal waveform based on the signal waveform configuration until reception of the RRC signal. Accordingly, terminal 200 generates a signal waveform based on a previously defined signal waveform configuration for the Post-IFFT processing or Pre-IFFT processing for a signal that needs to be transmitted and received before reception of the RRC signal (e.g., common channels such as a synchronization signal, broadcast signal, and random access signal) and generates a signal waveform based on the signal waveform configuration for the Post-IFFT processing or Pre-IFFT processing indicated by the RRC signal for a signal after reception of the RRC signal (e.g., a unicast channel). At this time, base station 100 and terminal 200 may determine a previously defined signal waveform configuration for Post-IFFT processing or Pre-IFFT processing in accordance with an allocation bandwidth.

As described above, according to Embodiment 3, base station 100 and terminal 200 can generate a signal waveform while flexibly switching between signal waveform configurations in accordance with an allocation bandwidth. Stated differently, base station 100 and terminal 200 can perform communication using a signal waveform taking into consideration both out-of-band emission and in-band distortion in accordance with the allocation bandwidth.

Note that, regarding the signal waveform configurations of Post-IFFT sections 107 and 207, a description has been given of the three configurations including one in which neither windowing nor filtering is applied, one in which windowing is applied, and one in which filtering is applied, but the signal waveform configurations of Post-IFFT sections 107 and 207 are not limited to the three configurations described above. For example, regarding filtering, multiple filtering methods (such as subband-based filtering, subcarrier-based filtering and/or the like) may be included in the configurations while parameters (filtering coefficient and filter length and/or the like) of filtering or windowing may be included in the configurations. Accordingly, base station 100 and terminal 200 can flexibly switch between the signal waveform configurations.

In addition, for the signal waveform configuration of Post-IFFT sections 107 and 207, not only an allocation bandwidth but also a frequency resource allocation method may be taken into consideration. For example, base station 100 and terminal 200 may determine to apply filtering in case of localized allocation in which allocation bands are consecutive (i.e., allocation bands are localized, and a frequency interval between ends of the allocation bands is narrow), and may determine not to apply filtering in case of distributed allocation (i.e., allocation bands spread over the entirety of the system band and a frequency interval between ends of the allocation bands is wide).

Embodiment 4

The basic configurations of a base station and a terminal according to Embodiment 4 are common to those of base station 100 and terminal 200 according to Embodiment 1, so that a description will be given with reference to FIGS. 6 and 7.

In Embodiment 4, a description will be given of a method of appropriately determining a signal waveform configuration in accordance with a situation of an adjacent band which is adjacent to an allocation band used by the base station and terminal for transmission and reception of signals.

The purpose of filtering and windowing is to suppress out-of-band emission and also to suppress inter-subcarrier interference given to an adjacent band. Meanwhile, filtering and windowing cause an increase in the computational complexity of transmission and reception apparatuses or cause a decrease in robustness against propagation delay. For this reason, when it is unnecessary to suppress the out-of-band emission, it is desirable neither to apply filtering nor windowing.

In this respect, in Embodiment 4, base station 100 and terminal 200 are allowed to have multiple configurations (modes) for Post-IFFT sections 107 and 207, and determine the signal waveform configuration of Post-IFFT sections 107 and 207 in accordance with a situation of an adjacent band which is adjacent to the allocation band.

For example, when the adjacent band of the allocation band is operated without any guard band, base station 100 (control section 101) and terminal 200 (control section 201) determine to apply filtering or windowing as the signal waveform configuration of Post-IFFT sections 107 and 207. Accordingly, base station 100 and terminal 200 can generate a signal waveform while suppressing the out-of-band emission to the adjacent band by filtering or windowing.

Meanwhile, when the adjacent band of the allocation band is not operated or is operated with a guard band, base station 100 and terminal 200 determine to apply neither filtering nor windowing as the signal waveform configuration of Post-IFFT sections 107 and 207. Accordingly, base station 100 and terminal 200 do not have to perform the signal processing required for filtering or windowing and thus can suppress propagation delay.

In addition, for Pre-IFFT sections 104 and 204 as well, base station 100 and terminal 200 are allowed to have multiple configurations (modes) for Pre-IFFT sections 104 and 204 and may generate a signal waveform while switching between the configurations of Pre-IFFT sections 104 and 204 in accordance with a situation of an adjacent band of the allocation band.

Note that, the signal waveform configuration of Post-IFFT sections 107 and 207 or Pre-IFFT sections 104 and 204 and the information about the adjacent band used in the signal waveform configuration (hereinafter, referred to as "adjacent band information") may be previously defined.

Furthermore, the signal waveform configuration of Post-IFFT sections 107 and 207 or the signal waveform configuration of Pre-IFFT sections 104 and 204, and the adjacent band information may be indicated to terminal 200 from base station 100 via higher-layer signaling such as an RRC signal. For example, when a common signal waveform configuration and adjacent band information are used in a single cell, base station 100 indicates, to terminals 200 in the cell, the signal waveform configuration and adjacent band information for the Post-IFFT processing or Pre-IFFT processing, using a cell-specific RRC signal.

Meanwhile, when multiple signal waveform configurations and adjacent band information for the Post-IFFT processing or Pre-IFFT processing are provided in a single cell, base station 100 may indicate, to terminal 200 in the cell, the multiple signal waveform configurations and adjacent band information in the cell for the Post-IFFT processing or Pre-IFFT processing, using a cell-specific RRC signal. Moreover, when a sub-RAT-specific RRC signal is defined, base station 100 may indicate, to terminals 200, the signal waveform configuration and adjacent band information for the Post-IFFT processing or Pre-IFFT processing in the sub-RAT, using the sub-RAT-specific RRC signal. Moreover, base station 100 may indicate, to each terminal 200, the signal waveform configuration and adjacent band information for the Post-IFFT processing or Pre-IFFT processing, using a terminal-specific RRC signal.

When the signal waveform configuration for the Post-IFFT processing or Pre-IFFT processing is indicated using the RRC signal, terminal 200 cannot generate a signal waveform based on the signal waveform configuration until reception of the RRC signal. Accordingly, terminal 200 generates a signal waveform for a signal needs to be transmitted and received before reception of the RRC signal (e.g., common channel such as synchronization signal, broadcast signal, and random access signal) based on the previously defined signal waveform configuration for the Post-IFFT processing or Pre-IFFT processing, and for a signal after reception of the RRC signal (e.g., unicast channel), generates a signal waveform based on the signal waveform configuration for the Post-IFFT processing or Pre-IFFT processing indicated via the RRC signal. At this time, base station 100 and terminal 200 may determine the previously defined signal waveform configuration for the Post-IFFT processing or Pre-IFFT processing in accordance with a situation of the adjacent band.

As described above, according to Embodiment 4, base station 100 and terminal 200 can generate a signal waveform while flexibly switching between signal waveform configurations in accordance with a situation of the adjacent band. Stated differently, base station 100 and terminal 200 can perform communication using a signal waveform taking into consideration the suppression of out-of-band emission, an increase in the computational complexity of transmission and reception apparatuses or the robustness against propagation delay.

Note that, regarding the signal waveform configurations of Post-IFFT sections 107 and 207, a description has been given of the three configurations including one in which neither windowing nor filtering is applied, one in which windowing is applied, and one in which filtering is applied, but the signal waveform configurations of Post-IFFT sections 107 and 207 are not limited to the three configurations described above.

For example, regarding filtering, multiple filtering methods (such as subband-based filtering, subcarrier-based filtering and/or the like) may be included in the configurations and parameters (filtering coefficient and filter length and/or the like) of filtering or windowing may be included in the configurations in accordance with a situation of the adjacent band. Accordingly, base station 100 and terminal 200 can flexibly switch between the signal waveform configurations.

In addition, for the signal waveform configurations of Post-IFFT sections 107 and 207, the situation of an adjacent band is not limited to the presence or absence of a guard band configuration, and for example, a subcarrier spacing or allocation bandwidth may be taken into consideration. More specifically, the impact of interference on a sub-RAT using a wide subcarrier spacing from a sub-RAT using a narrow subcarrier spacing is not as large as the impact of interference on a sub-RAT using a narrow subcarrier spacing from a sub-RAT using a wide subcarrier spacing, which is the opposite way. Thus, when a sub-RAT using a narrower subcarrier spacing than a subcarrier spacing in the allocation band of terminal 200 is operated in an adjacent band, base station 100 and terminal 200 determine to apply filtering or windowing to suppress the out-of-band emission to the adjacent band. Meanwhile, when a sub-RAT using a larger subcarrier spacing than a subcarrier spacing in the allocation band of terminal 200 is operated in an adjacent band, base station 100 and terminal 200 determine to apply neither filtering nor windowing and reduce the computational complexity required for filtering or windowing and thereby to suppress propagation delay.

In addition, for the signal waveform configurations of Post-IFFT sections 107 and 207, not only the situation of the adjacent band but also the allocation frequency position used by base station 100 or terminal 200 for transmission and reception may be taken into consideration. For example, when the allocation frequency position is located near the adjacent band which is adjacent to the allocation band in the allocation band (i.e., when the allocation frequency position is at the edge of the allocation band and the impact of interference is given to the adjacent band), base station 100 and terminal 200 may determine to apply filtering, and when the allocation frequency position is not near the adjacent band in the allocation band (e.g., when the allocation frequency position is near a center of the allocation band and the impact of interference is not given to the adjacent band), base station 100 and terminal 200 may determine not to apply filtering.

In addition, for the signal waveform configurations of Post-IFFT sections 107 and 207, base station 100 and terminal 200 may use multiple Post-FFT configurations for a single terminal. For example, base station 100 and terminal 200 may set a configuration to apply filtering only to a band near an adjacent band adjacent to the allocation band in the allocation band (i.e., the portion which is at the edge of the allocation band and which gives the impact of interference to the adjacent band) and may set a configuration not to apply filtering to a band not near the adjacent band in the allocation band (e.g., the portion which is near a center of the allocation band and which does not give any impact of interference to the adjacent band).

Embodiment 5

In Embodiment 5, a description will be given of a method of dynamically indicating a signal waveform configuration.

The basic configurations of a base station and a terminal according to Embodiment 5 are common to those of base station 100 and terminal 200 according to Embodiment 1, so that a description will be given with reference to FIGS. 6 and 7.

In Embodiments 1 through 4, an assumption is made that the signal waveform configuration of Post-IFFT sections 107 and 207 or Pre-IFFT sections 104 and 204 is previously defined or is indicated to terminal 200 from base station 100 via higher-layer signaling such as an RRC signal or the like.

Meanwhile, as described in Embodiments 3 and 4, the allocation band width or the situation of an adjacent band of the allocation band may vary.

For this reason, it is desirable to set the signal waveform configuration of Post-IFFT sections 107 and 207 or Pre-IFFT sections 104 and 204 to be dynamically configurable.

In this respect, in Embodiment 5, base station 100 and terminal 200 are allowed to have multiple configurations (modes) of Post-IFFT sections 107 and 207 and generate a signal waveform while switching between the signal waveform configurations of Post-IFFT sections 107 and 207 using a dynamic indication such as a downlink control signal (DCI) or MAC header and/or the like.

For Pre-IFFT sections 104 and 204 as well, base station 100 and terminal 200 are allowed to have multiple configurations (modes) of Pre-IFFT sections 104 and 204 and generate a signal waveform while switching between the signal waveform configurations of Pre-IFFT sections 104 and 204 using a dynamic indication such as a downlink control signal (DCI) or MAC header and/or the like.

As described above, according to Embodiment 5, base station 100 and terminal 200 can dynamically switch between the signal waveform configurations of Post-IFFT sections 107 and 207 or Pre-IFFT sections 104 and 204, for example, in accordance with the allocation bandwidth or a variation of an adjacent band of the allocation band. Thus, base station 100 and terminal 200 can perform communication using an appropriate signal waveform taking into consideration the suppressing of out-of-band emission, an increase in the computational complexity of transmission and reception apparatuses, or the robustness against propagation delay.

Each embodiment of the present disclosure has been described thus far.

Note that, in Embodiments 1 through 5, the description has been given of the previously defined method, the indication method using an RRC signal, and the dynamic indication method using a downlink control signal or MAC header and/or the like regarding the signal waveform of Post-IFFT sections 107 and 207 or Pre-IFFT sections 104 and 204, but some or all of these methods may be used in combination for signal waveform configurations.

For example, base station 100 and terminal 200 may configure the presence or absence of applying filtering by the previously defined method or the indication method using an RRC signal and may further configure filtering parameters using the dynamic indication method.

Moreover, in the embodiments described above, the description has been given of the case where base station 100 and terminal 200 are allowed to have multiple configurations (modes) of Post-IFFT sections 107 and 207 or Pre-IFFT sections 104 and 204, regarding a signal waveform of Post-IFFT sections 107 and 207 or Pre-IFFT sections 104 and 204. However, the configurations (modes) of Post-IFFT sections 107 and 207 or Pre-IFFT sections 104 and 204, which are configurable by base station 100 and terminal 200, may be different in accordance with specific channels (e.g., downlink, uplink, side link) or sub-RATs. More specifically, base station 100 and terminal 200 may associate some of the multiple configurations with the specific channels or sub-RATs. With this configuration, the number of combinations between the specific channels or sub-RATs and the signal waveform configurations is reduced, so that the signaling overhead can be reduced.

The above embodiments have been described with an example in which an aspect of the present disclosure is implemented using a hardware configuration, but the present disclosure may also be implemented by software in cooperation with hardware.

In addition, the functional blocks used in the descriptions of the embodiments are typically implemented as LSI devices, which are integrated circuits having an input and output. The integrated circuits may control the functional blocks used in the descriptions of the embodiments and may include an input and output. The functional blocks may be formed as individual chips, or a part or all of the functional blocks may be integrated into a single chip. The term "LSI"

is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A transmission apparatus of the present disclosure includes: an IFFT section that performs IFFT processing on a transmission signal; a control section that determines a signal waveform configuration for the transmission signal after the IFFT processing in accordance with a communication environment of the transmission apparatus; and a Post-IFFT section that performs Post-IFFT processing on the transmission signal after the IFFT processing based on the determined signal waveform configuration.

In the transmission apparatus of the present disclosure, the control section determines to apply filtering or windowing as the signal waveform configuration when a plurality of transmission apparatuses operate asynchronously.

In the transmission apparatus of the present disclosure, the control section determines not to apply filtering or determines to apply windowing as the signal waveform configuration when low latency communication is required for the transmission apparatus.

In the transmission apparatus of the present disclosure, the control section determines to apply filtering as the signal waveform configuration when an allocation bandwidth allocated for communication of the transmission apparatus is less than a threshold, and determines not to apply filtering or determines to apply windowing as the signal waveform configuration when the allocation bandwidth is equal to or greater than the threshold.

In the transmission apparatus of the present disclosure, the control section determines to apply neither filtering nor windowing as the signal waveform configuration when a guard band is configured in an adjacent band adjacent to an allocation band allocated for communication of the transmission apparatus, and determines to apply filtering or windowing as the signal waveform configuration when no guard band is configured in the adjacent band.

In the transmission apparatus of the present disclosure, a correspondence relationship between the communication environment and the signal waveform configuration is previously defined.

In the transmission apparatus of the present disclosure, the signal waveform configuration is indicated to the transmission apparatus via higher-layer signaling or a control channel.

A reception apparatus of the present disclosure includes: a control section that determines a signal waveform configuration for a signal transmitted from a transmission apparatus, in accordance with a communication environment of the transmission apparatus; a Pre-FFT section that performs Pre-FFT processing on the signal based on the determined signal waveform configuration; and an FFT section that performs FFT processing on the signal after the Pre-FFT processing.

A communication method of the present disclosure includes: performing IFFT processing on a transmission signal; determining a signal waveform configuration for the transmission signal after the IFFT processing in accordance with a communication environment of a transmission apparatus; and performing Post-IFFT processing on the transmission signal after the IFFT processing based on the determined signal waveform configuration.

A communication method of the present disclosure includes: determining a signal waveform configuration for a signal transmitted from a transmission apparatus, in accordance with a communication environment of the transmission apparatus; performing Pre-FFT processing on the signal based on the determined signal waveform configuration; and performing FFT processing on the signal after the Pre-FFT processing.

INDUSTRIAL APPLICABILITY

An aspect of this disclosure is useful in mobile communication systems.

REFERENCE SIGNS LIST

100 Base station
101, 201 Control section
102, 202 Encoding section
103, 203 Modulation section
104, 204 Pre-IFFT section
105, 205 Signal assignment section
106, 206 IFFT section
107, 207 Post-IFFT section
108, 208 Transmission section
109, 209 Antenna
110, 210 Reception section
111, 211 Extraction section
112, 212 FFT section
113, 213 Signal detecting section
114, 214 Demodulation section
115, 215 Decoding section
200 Terminal The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A transmission apparatus, comprising:
an IFFT section that performs IFFT processing on a transmission signal;
a control section that determines a signal waveform configuration for the transmission signal after the IFFT processing in accordance with a communication environment of the transmission apparatus; and a Post-IFFT section that performs Post-IFFT processing on the transmission signal after the IFFT processing based on the determined signal waveform configuration, wherein the control section determines to apply neither filtering nor windowing as the signal waveform configuration when a guard band is configured in an adjacent band adjacent to an allocation band allocated for communication of the transmission apparatus, and determines to apply filtering or windowing as the signal waveform configuration when no guard band is configured in the adjacent band.

2. A reception apparatus comprising:

a control section that determines a signal waveform configuration for a signal transmitted from a transmission apparatus, in accordance with a communication environment of the transmission apparatus;

a Pre-FFT section that performs Pre-FFT processing on the signal based on the determined signal waveform configuration; and an FFT section that performs FFT processing on the signal after the Pre-FFT processing, wherein the control section determines to apply neither filtering nor windowing as the signal waveform configuration when a guard band is configured in an adjacent band adjacent to an allocation band allocated for communication of the transmission apparatus, and determines to apply filtering or windowing as the signal waveform configuration when no guard band is configured in the adjacent band.

3. A communication method comprising:

performing IFFT processing on a transmission signal;

determining a signal waveform configuration for the transmission signal after the IFFT processing in accordance with a communication environment of a transmission apparatus;

performing Post-IFFT processing on the transmission signal after the IFFT processing based on the determined signal waveform configuration; and determining to apply neither filtering nor windowing as the signal waveform configuration when a guard band is configured in an adjacent band adjacent to an allocation band allocated for communication of the transmission apparatus, and determining to apply filtering or windowing as the signal waveform configuration when no guard band is configured in the adjacent band.

4. A communication method comprising:

determining a signal waveform configuration for a signal transmitted from a transmission apparatus, in accordance with a communication environment of the transmission apparatus;

performing Pre-FFT processing on the signal based on the determined signal waveform configuration;

performing FFT processing on the signal after the Pre-FFT processing; and determining to apply neither filtering nor windowing as the signal waveform configuration when a guard band is configured in an adjacent band adjacent to an allocation band allocated for communication of the transmission apparatus, and determining to apply filtering or windowing as the signal waveform configuration when no guard band is configured in the adjacent band.

* * * * *